(12) United States Patent
Hoellriegl et al.

(10) Patent No.: US 8,709,312 B2
(45) Date of Patent: Apr. 29, 2014

(54) BLOW MOULDING MACHINE WITH COMPRESSED AIR RECYCLING

(75) Inventors: Thomas Hoellriegl, Teublitz (DE); Andreas Brunner, Aufhausen (DE)

(73) Assignee: Krones AG, Neutraubling (DE)

( * ) Notice: Subject to any disclaimer, the term of this patent is extended or adjusted under 35 U.S.C. 154(b) by 197 days.

(21) Appl. No.: 13/154,414

(22) Filed: Jun. 6, 2011

(65) Prior Publication Data

US 2012/0007290 A1    Jan. 12, 2012

(30) Foreign Application Priority Data

Jun. 18, 2010 (DE) .................. 10 2010 024 277

(51) Int. Cl.
*B29C 49/12* (2006.01)

(52) U.S. Cl.
USPC ............ 264/39; 264/532; 425/182; 425/529; 425/540

(58) Field of Classification Search
CPC ............... B29C 2049/1271; B29C 2049/1276
USPC ........ 425/182, 529, 540, DIG. 5; 264/39, 532
See application file for complete search history.

(56) References Cited

U.S. PATENT DOCUMENTS

| | | | |
|---|---|---|---|
| 5,585,066 A * | 12/1996 | Weiss | 264/526 |
| 5,611,987 A * | 3/1997 | Kato et al. | 264/458 |
| 2004/0173949 A1 * | 9/2004 | Storione et al. | 264/529 |
| 2009/0039569 A1 * | 2/2009 | Finger et al. | 264/572 |

FOREIGN PATENT DOCUMENTS

DE         20006524 U1 *  6/2000

OTHER PUBLICATIONS

Partial machine translation of DE20006524U1 dated Jun. 2000 obtained from the espacenet website.*

* cited by examiner

*Primary Examiner* — Robert B Davis
(74) *Attorney, Agent, or Firm* — Novak Druce Connolly Bove+Quigg LLP

(57) ABSTRACT

An apparatus for shaping plastic preforms into plastic containers, including a plurality of blow molding stations which each have a cavity in which the plastic preforms can be shaped into plastic containers. The blow molding stations are arranged on a movable carrier and each have a stretching rod which stretches the plastic containers in their longitudinal direction by a movement in a stretching direction. A fluid-actuated drive device is provided for driving the stretching rod in the stretching direction. The apparatus includes a guide cam which is arranged in a stationary manner and by means of which the stretching rod can be moved counter to the stretching direction as a function of a movement of the blow molding station. At least one portion of the guide cam is adjustable and, for example, by virtue of this adjustment a dependency of the movement of the stretching rod on the movement of the blow molding station can be varied.

12 Claims, 4 Drawing Sheets

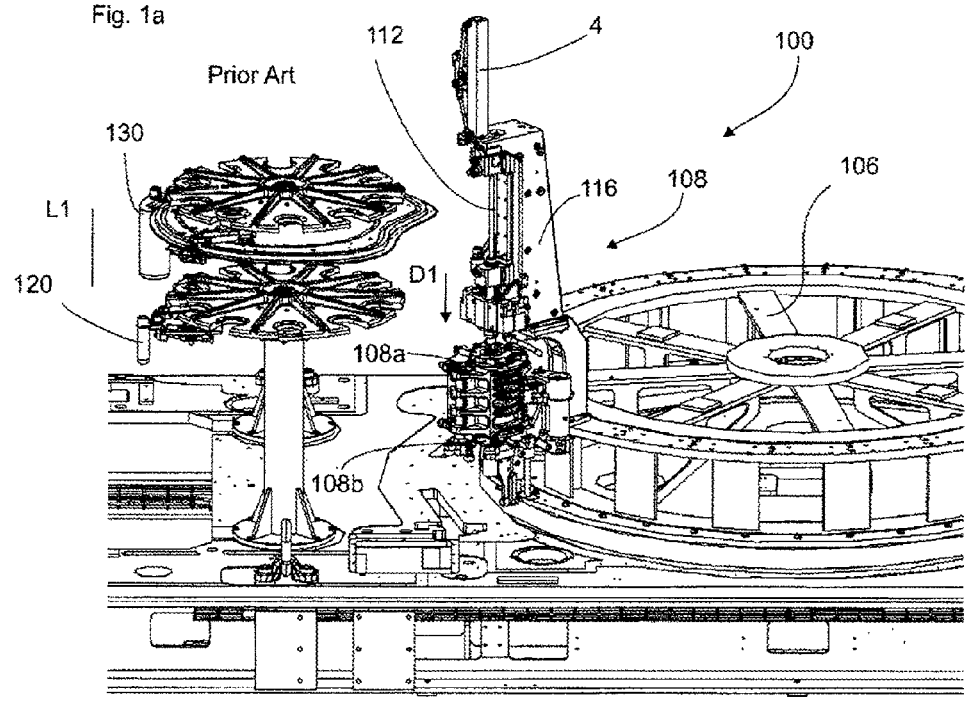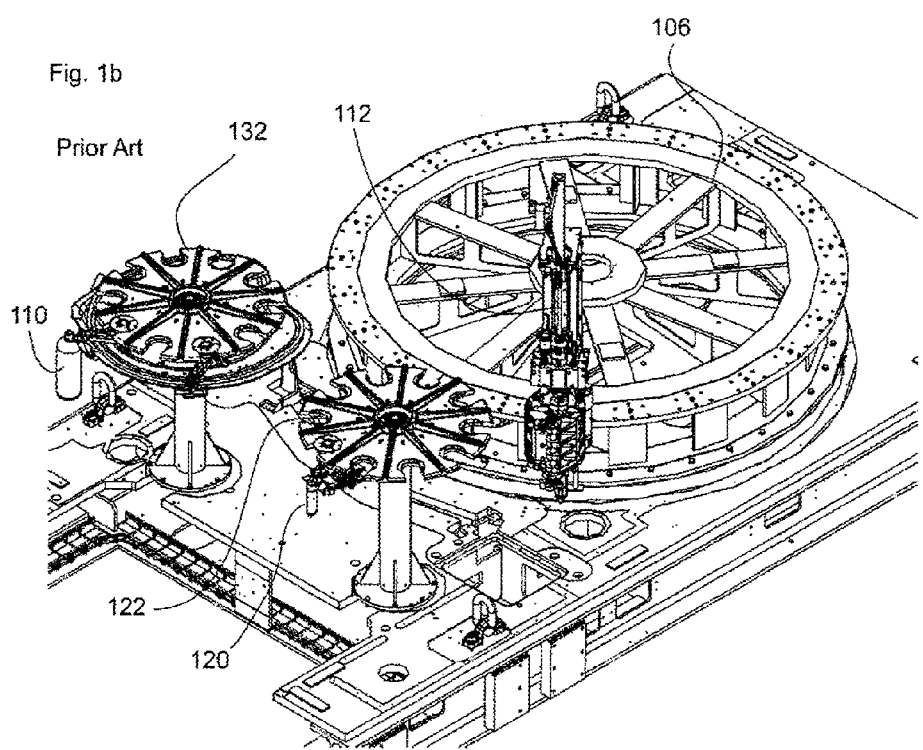

Fig. 2
Fig. 3
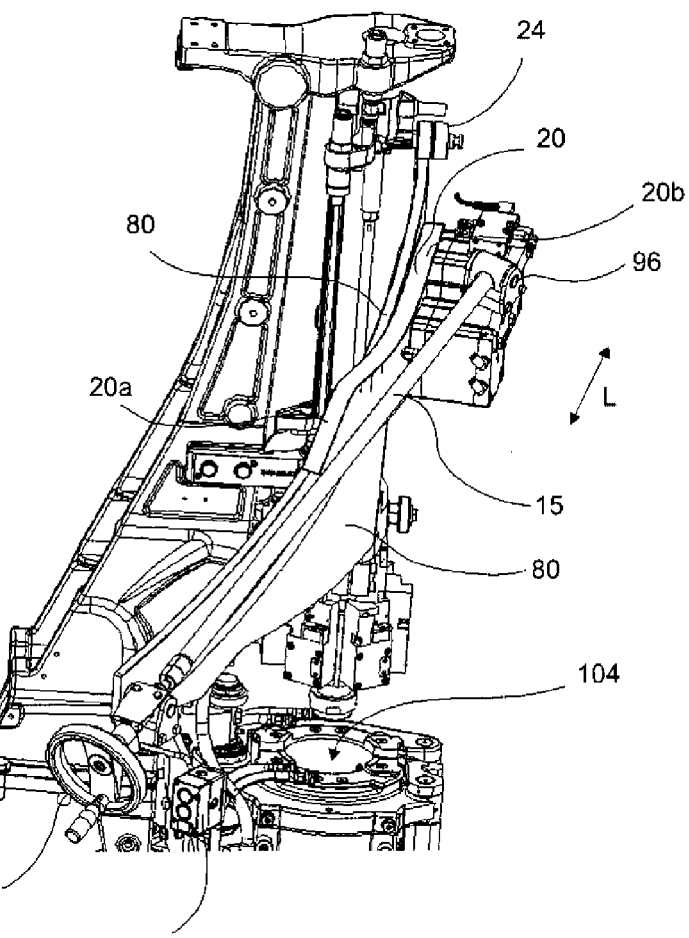
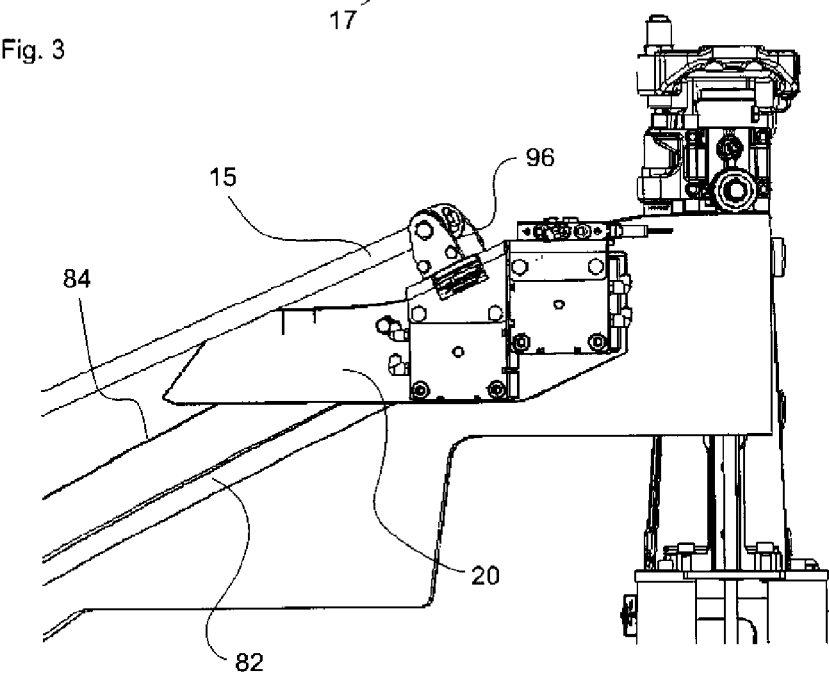

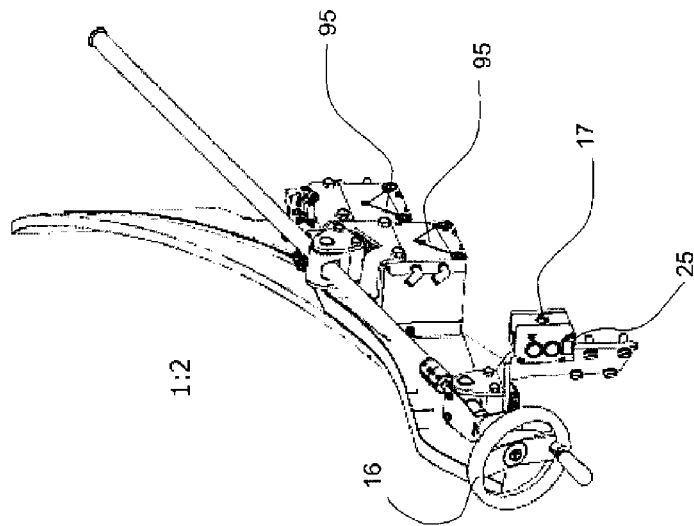
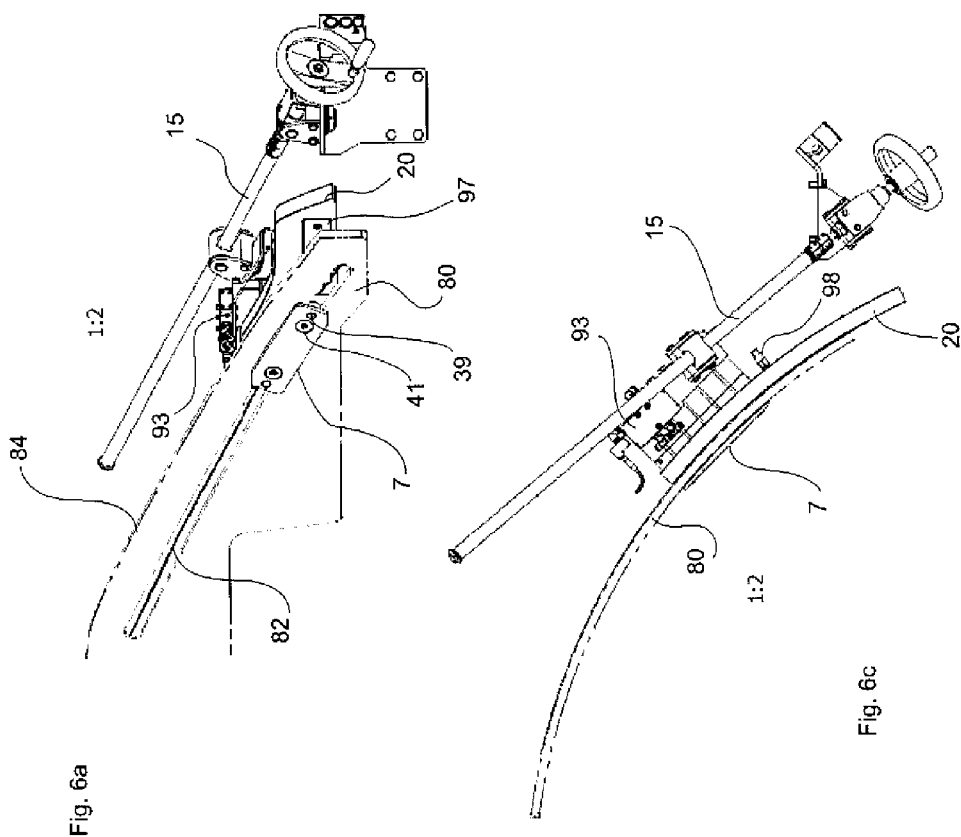

BLOW MOULDING MACHINE WITH COMPRESSED AIR RECYCLING

CROSS-REFERENCE TO RELATED APPLICATION

This application claims the benefit of priority of German Patent Application No. 10 2010 024 277.2, filed Jun. 18, 2010, pursuant to 35 U.S.C. 119(a)-(d), the disclosure of which is incorporated herein by reference.

TECHNICAL FIELD

The present disclosure relates to a blow moulding machine for shaping plastic preforms into plastic containers.

BACKGROUND

Blow moulding machines for shaping plastic preforms into plastic containers are known from the prior art. Usually, such blow moulding machines comprise a plurality of blow moulding stations, within which cavities are formed in which plastic preforms can be shaped into plastic containers by applying compressed air. It is also known that such blow moulding stations comprise stretching rods which stretch the plastic preforms in their longitudinal direction during the expansion process. A wide range of drive concepts are known for these stretching rods. For instance, it is conceivable that the stretching rods are controlled by means of electric motor drives or by means of cams. It is also known for these stretching rods to be actuated by pneumatic drives. To this end, both an extending of the stretching rod, which stretches the plastic preform, and a retracting of the stretching rod are pneumatically driven.

In the prior art, however, such blow moulding machines have a relatively high energy consumption, wherein the drive devices for actuating the stretching rod are also noticeable in the energy balance.

It may therefore be desirable to improve the energy balance of such blow moulding machines.

SUMMARY

According to various aspects of the disclosure, an apparatus for shaping plastic preforms into plastic containers comprises a plurality of blow moulding stations which each have a cavity in which the plastic preforms can be shaped into plastic containers. These blow moulding stations are arranged on a movable carrier and each have a stretching rod which stretches the plastic containers in their longitudinal direction by a movement of the stretching rod in a stretching direction. A drive device is provided for driving the stretching rod in the stretching direction.

According to the disclosure, the apparatus comprises a guide cam which is arranged in a stationary manner and by means of which the stretching rod can be moved counter to the stretching direction as a function of a movement of the blow moulding station, wherein at least one portion of this guide cam is adjustable and, for example, by virtue of this adjustment the dependency of the movement of the stretching rod (in particular counter to the stretching direction) on the movement of the blow moulding station can be varied. Varying the dependency of the movement of the stretching rod on the movement of the blow moulding station is understood to mean that, for a given stretching rod, the relationship between the position thereof and the position of the blow moulding station to which this stretching rod is assigned is at least partially varied. By virtue of the adjusting of a geometric position of the guide cam relative to a movement path of the individual blow moulding stations this relationship is changed. For example, a position changes in a direction perpendicular to a movement plane of the blow moulding stations.

It is therefore proposed according to the disclosure that the movement of the stretching rod counter to the stretching direction, i.e. from a fully extended position to a retracted position, is brought about by the guide cam. For example, the stretching rod may have a stretching carriage with a guide roller, wherein this guide roller is movable relative to the guide cam and in this way a retracting movement of the stretching rod is achieved during a movement of the blow moulding station. Advantageously, therefore, a movement of the stretching rod in the stretching direction is driven by a pneumatic and/or electric drive device and the movement counter to the stretching direction is achieved by means of the guide cam.

This guide cam will also be referred to below as the run-up segment. Such run-up segments can be used to bring the stretching rod or the cam-controlled stretching carriage including the stretching rod from the lower end position, i.e. in the stretching stop, back into the upper end position, i.e. the starting position.

The position of this guide cam is dependent for example on the length of the containers to be produced. If long containers are used, a lower position of the run-up segment is required; if short bottles are to be produced, a correspondingly higher position is required. It is therefore helpful if the position of the run-up segment or of the guide device can be varied when changing the type of container.

In an exemplary embodiment, at least one drive device is and, for example, all the drive devices are fluid-actuated and in particular pneumatically actuated drive devices. In a further exemplary embodiment, at least one drive device is an electrically operated drive device and comprises in particular an electric motor. This electric motor may be either a linear motor or a rotary drive. By returning the stretching rod counter to the stretching direction, such an electric motor can act as a generator and in this way can generate electrical energy.

In an exemplary embodiment, the (pneumatic) drive devices of at least two blow moulding stations are at least at times in fluid communication (in particular compressed air communication) with one another. For instance, it is conceivable that, during the return of the stretching rod to its starting position, the compressed air can be discharged to a further blow moulding station, as a result of which in this further blow moulding station the stretching rod can in turn be moved downwards.

In some aspects, the apparatus comprises a reservoir for the fluid for actuating the drive devices, and this reservoir is in flow communication with all the drive devices for actuating the stretching rod. All the drive devices may for instance be pneumatic drives which are supplied with compressed air from a common annular channel. When the guide cam pushes a stretching rod back into the starting position, the resulting compressed air can be fed into the annular channel and, due to the resulting positive pressure, a further stretching rod can in turn be moved downwards.

In some aspects, the fluid or the air in the exemplary reservoir is at a positive pressure, which is, for example, also maintained in the operating mode of the apparatus.

In this way, a recycling of compressed air is possible when using the guide cam.

In some aspects, the apparatus comprises an actuation element for adjusting the portion of the guide cam, and a movement of this actuation element is coupled to a movement of the portion of the guide cam.

In principle, it would also be possible that the run-up segment is screwed onto a carrier by screw devices, such as hexagon screws for example, and an adjustment takes place by loosening these screws and then displacing the guide cam. In this case, however, the accessibility of these screws and the possibility of precise adjustment may be problematic. By providing an actuation element, such as for example a rotary spindle or a rotary lever, it can be ensured that a very precise adjustment of the guide cam or of the run-up segment is possible. A movement of this actuation lever is coupled to the movement of the run-up segment in a predefined manner, for example by using a rotary spindle.

In some aspects, the guide cam is arranged on a holding device in such a way as to be displaceable along a predefined displacement travel. This holding device may be for example a so-called catch cam, which is known from the prior art. This catch cam may in turn have an elongate hole, in which the guide cam is displaceably arranged. This elongate hole also predefines a clearly defined displacement travel for the guide cam. The guide cam is, for example, arranged on the catch cam in such a way that these merge geometrically into one another, i.e. in such a way that a guide roller moving along the guide cam transitions smoothly and without disruption into the catch cam.

In an exemplary embodiment, the guide cam can be arrested relative to the holding device. For example, it would be possible that the guide cam is arrested relative to the holding device by means of screw connections. However, it would also be possible that clamping cylinders are used to hold the guide cam. This will be explained in more detail below with reference to the figures.

In an exemplary embodiment, the guide cam is adjustable along a movement path of the blow moulding stations. This means that the blow moulding stations move along a predefined movement path, for example along a circular path when arranged on a blow moulding wheel, and the guide cam is adjustable along this path or along a path concentric thereto.

In an exemplary embodiment, the apparatus comprises a display device for outputting information characteristic of a position of the guide cam. For example, a scale may be provided in the region of the actuation element. However, it would also be possible that an appropriate display device or scale is provided on the holding device or also on the guide cam, by means of which the exact geometric position of the guide cam can be determined.

In an exemplary embodiment, the holding device is a further guide cam which serves at least at times for moving the stretching rod. In the prior art, this so-called catch cam may also be used when, for certain reasons, a return movement of the stretching rod does not take place, for example because the associated pneumatic cylinder is defective. In this case, it must nevertheless be ensured that the stretching rod is pulled back since, if the stretching rod remains in the container and the latter is then removed from the blow mould, this could result in serious damage to the installation.

In an exemplary embodiment, an arresting of the guide cam relative to the holding device is controlled by a valve device.

It is also possible that the guide cam (particularly even when the arresting is released) is biased towards the holding device. By virtue of this biasing, even if the clamping is inadvertently relaxed, there is still sufficient friction so that inadvertent movement during operation is ruled out even after the actual arresting has been released.

The guide cam may be advantageously curved, that is to say in particular not only has a curved edge along which a cam roller can move, but rather is also curved in a direction extending perpendicular to the course of the edge. This curvature may be adapted to the curvature of a movement path of the individual blow moulding stations. In other words, the guide cam here is curved and is movable radially relative to the centre of the blow moulding machine along the curved cam.

The present disclosure also relates to a method for operating an apparatus for shaping plastic preforms into plastic containers, wherein the apparatus comprises a plurality of blow moulding stations which each have a cavity in which the plastic preforms are shaped into plastic containers. These blow moulding stations are arranged on a movable carrier and each have a stretching rod which stretches the plastic containers in their longitudinal direction by a movement in a stretching direction. The stretching rods are driven in the stretching direction by a drive device, and the apparatus can be converted for different containers and, when converting the machine, at least a bottom mould of a blow moulding station, which serves for producing the plastic containers, is replaced by a different bottom mould.

According to the disclosure, the apparatus comprises a guide cam which is arranged in a stationary manner and by means of which the stretching rod is moved counter to the stretching direction as a function of a movement of the blow moulding station, and this guide cam is adjusted during the conversion of the machine. By virtue of this conversion, the apparatus can be converted in particular to different heights of the containers to be produced, but optionally also to different heights of the plastic preforms used.

In some aspects, the guide cam is adjusted as a function of a height of the bottom mould. The bottom mould is in this case advantageously part of a blow mould which may additionally also comprise two side parts. These side parts and the bottom mould, or the respective inner surfaces thereof, may form the abovementioned cavity and the plastic preforms are expanded against this inner wall to form the plastic containers.

Further exemplary embodiments and advantages may be evident from the accompanying drawings.

BRIEF DESCRIPTION OF THE DRAWINGS

In the drawings:

FIGS. 1a, 1b show diagrams of an apparatus according to the prior art;

FIG. 2 shows a detail view of an exemplary apparatus according to various aspects of the disclosure;

FIG. 3 shows a further detail view of the apparatus of FIG. 2;

FIGS. 6a-6c show three detailed set-ups for exemplary actuation of the guide cam according to the disclosure.

DETAILED DESCRIPTION

Figure 4:
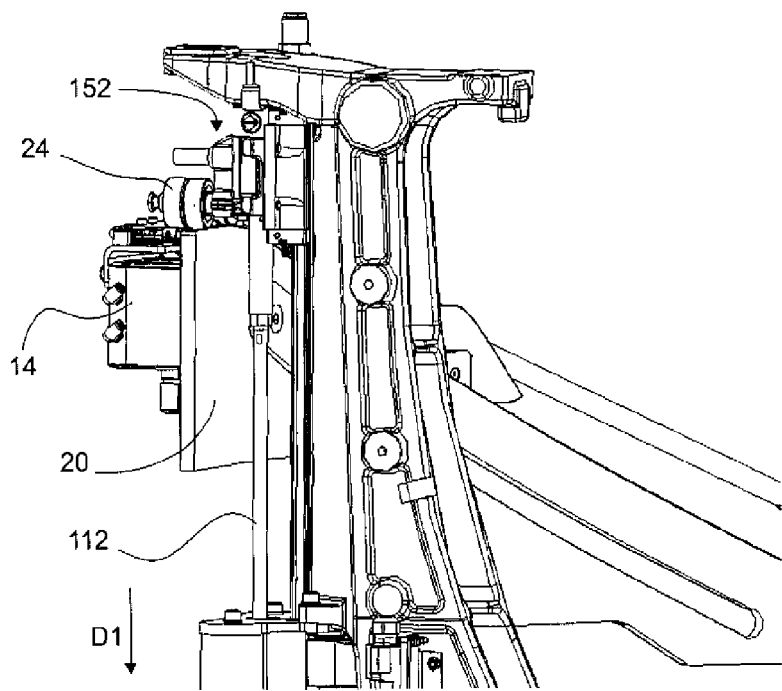
FIG. 4 shows a further detail view of the apparatus of FIG. 2.

FIGS. 1a and 1b show two diagrams of an apparatus 100 for shaping plastic preforms into plastic containers. A rotatable blow moulding wheel 106 is provided, on which a plurality of blow moulding stations 108 are arranged (only one blow moulding station 108 is shown here). This blow moulding wheel 106 rotates together with the individual blow moulding stations 108. During the rotation, the plastic preforms 120, which are fed to the blow moulding wheel 106 and the blow moulding stations 108 by means of a feed wheel 122, are shaped into plastic containers. These plastic containers 130 are discharged again from the apparatus via a discharge wheel 132.

Reference 14 in FIG. 1a shows a drive device which serves for actuating the stretching rod 112, i.e. for moving the stretching rod 112 in the stretching direction D1. Reference 116 denotes a carrier, on which the stretching rod arrangement is arranged. Reference L1 denotes a longitudinal direction of the container, along which the stretching rod 112 also moves. Reference 108a denotes a side part carrier of the blow moulding station, on which a side part (not shown) of the associated blow mould is arranged, and reference 108b denotes a bottom part carrier, on which a bottom mould (not shown) of the blow mould is arranged.

FIG. 2 shows a first diagram to illustrate the exemplary aspects of the disclosure. Shown here is a guide cam 20 which is adjustable. The guide cam 20 is arranged in its entirety on a holding device 80 and is movable relative to this holding device. The holding device itself is arranged in a stationary manner, so that the individual blow moulding stations 8 move relative to this holding device 80 and thus also relative to the guide cam 20. The holding device may itself serve as a catch cam.

Reference 104 denotes a cavity which is formed inside the individual blow moulding stations in order to expand therein plastic preforms into plastic containers. Reference 15 denotes a spindle which is rotatable by means of an actuation element 16 in order in this way to displace an end section 96 or a holding element 96 in the longitudinal direction L of this spindle. Also arranged on this holding element 96 is the guide cam or the run-up segment 20 in order in this way to be able likewise to displace the latter (relative to the holding device).

It can be seen in particular in FIG. 2 that the guide cam or the run-up segment 20 has two portions 20a and 20b with a different inclination. The portion 20a of the run-up segment 20 has a greater inclination than the portion 20b. The portion 20b is in any case matched in its end section to an inclination of the holding device 80. The guide roller 24 is configured here in such a way that it can roll both on the holding device 80 and also on the guide cam or run-up segment 20. In particular, by means of the holding device, the cam roller and thus the stretching carriage with the stretching rod can be brought into the upper stop position. The holding device 80 or the further cam can also continue further in the horizontal direction in order to keep the stretching rod in the upper position.

FIG. 3 shows a side view of the apparatus shown in FIG. 2. It can be seen that the spindle 15 is articulated on the holding device 96 and is therefore pivotable relative to the latter. Reference 82 denotes an elongate hole which is formed in the holding device 80 and relative to which the run-up segment can move. This elongate hole 82 runs parallel to an upper edge 84 of the holding device, which acts here as a further guide cam.

Figure 5:
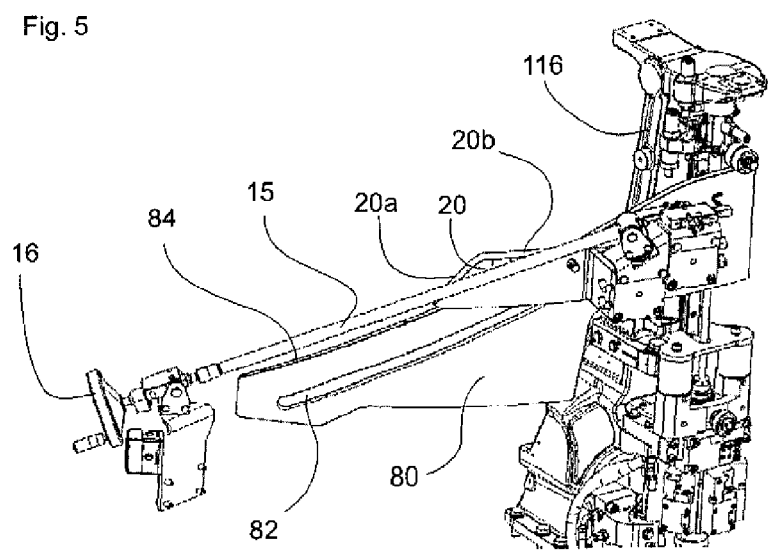
FIG. 5 shows a further detail view of the apparatus of FIG. 2.

FIGS. 4 and 5 show a further diagram of the arrangement shown in FIG. 2. It is also possible to see here the guide roller 24 which is indirectly connected to the stretching rod 112 and which is arranged on a stretching carriage 132 in order to move the latter. As mentioned above, the actuation of the stretching rod 112 in the direction D1 takes place via the pneumatic drive device 14. As shown in FIG. 5, the adjustment of the run-up segment takes place via the threaded spindle 15, which is adjustable when the clamping between the run-up segment 20 and the holding device 80 is loosened.

In order to ensure a reproducible setting, a position indicator or counter is fitted. The operating elements, i.e. the actuation element 16, is located to the side of the machine and is thus easily visible and accessible. The elongate hole 82 runs parallel to the course of the cam.

FIGS. 6a-6c show a further diagram of the actuation device according to the disclosure. It is possible to see a clamping jaw 7 which is arranged on the run-up segment 20 by means of screw devices 41 and in this way brings about a clamping relative to the holding device 80. Reference 39 denotes a bolt. Reference 95 shown in FIG. 6c denotes a clamping cylinder which serves for drawing the clamping jaw 7 against the holding device or catch cam 80. These clamping cylinders are biased by plate springs on the piston rod side and an autonomous adjustment of the run-up segment 20 is thus not possible even in the pressureless state. In the operating state of the machine, the clamping cylinders 95 are additionally acted upon and thus the ultimately required clamping force (spring+compressed air) is produced. Friction linings 97 are arranged on the run-up segment 20. These friction linings, for example, three friction linings, prevent any displacement of the run-up segment 20 in the operating state. In order to release the clamping, a button 17 is actuated, a valve acts upon the cylinder 95 on the piston side and the clamping is released. This valve is denoted by reference 93. Reference 25 denotes a position indicator which indicates a position of the hand wheel 16. Reference 98 denotes a vibration sensor, by means of which the correct setting of the run-up segment 20 is monitored in the operating state. If the vibrations measured by this vibration sensor are too high, this indicates that the cam roller 24 has been placed too roughly onto the run-up segment 20.

In the case of automated adjustment, it is possible to replace the hand wheel 16 by an actuating drive as the actuation element. This can be integrated in the control system of the machine and can be automatically adjusted when changing the type of container. In this way, setting errors and thus disruptions or damage to the machine can be avoided.

It will be apparent to those skilled in the art that various modifications and variations can be made to the blow moulding machine with compressed air recycling of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. Apparatus for shaping plastic preforms into plastic containers, comprising:
   a plurality of blow moulding stations, each of which has a cavity in which the plastic preforms can be shaped into plastic containers, said blow moulding stations being arranged on a movable carrier, each moulding station having
      a stretching rod which stretches the plastic containers in their longitudinal direction by a movement in a stretching direction; and
      a drive device for driving the stretching rod in the stretching direction;
   a guide cam which is arranged in a stationary manner and by means of which the stretching rod is movable counter to the stretching direction as a function of a movement of the blow moulding station, at least one portion of said guide cam being adjustable; and, an actuation element for adjusting the portion of the guide cam, a movement of said actuation element being coupled to a movement of the portion of the guide cam, wherein, by virtue of said adjustment, a dependency of the movement of the stretching rod counter to the stretching direction on the movement of the blow moulding station is variable.

2. Apparatus according to claim 1, wherein at least one said drive device is a fluid-actuated drive device.

3. Apparatus according to claim 1, wherein at least one said drive device comprises an electric motor.

4. Apparatus according to claim 1, wherein the drive devices of at least two of said blow moulding stations are at least at times in fluid communication with one another.

5. Apparatus according to claim 2, wherein the apparatus comprises a reservoir for the fluid for actuating said at least one drive device, and this reservoir is in flow communication with all the drive devices.

6. Apparatus for shaping plastic preforms into plastic containers, comprising:
   a plurality of blow moulding stations, each of which has a cavity in which the plastic preforms can be shaped into plastic containers, said blow moulding stations being arranged on a movable carrier, each moulding station having
      a stretching rod which stretches the plastic containers in their longitudinal direction by a movement in a stretching direction; and
      a drive device for driving the stretching rod in the stretching direction;
   a guide cam which is arranged in a stationary manner and by means of which the stretching rod is movable counter to the stretching direction as a function of a movement of the blow moulding station, at least one portion of said guide cam being adjustable,
   wherein, by virtue of said adjustment, a dependency of the movement of the stretching rod counter to the stretching direction on the movement of the blow moulding station is variable, and
   wherein the guide cam is arranged on a holding device in such a way as to be displaceable along a predefined displacement travel and the holding device is a further guide cam which serves at least at times for moving the stretching rod, and wherein an arresting of the guide cam relative to the holding device is controlled by a valve device.

7. Apparatus according to claim 6, wherein the guide cam can be arrested relative to the holding device.

8. Apparatus according to claim 1, wherein the guide cam is adjustable along a movement path of the blow moulding stations.

9. Apparatus according to claim 6, wherein the guide cam is biased towards the holding device.

10. Method for operating an apparatus for shaping plastic preforms into plastic containers, the method comprising:
   providing an apparatus according to claim 1;
   driving the stretching rods in the stretching direction by a drive device;
   converting the apparatus for different containers by replacing a first bottom mould of a blowing station with a second bottom mould different from said first bottom mould, said first and second bottom moulds serving for producing the plastic containers;
   arranging a guide cam in a stationary manner;
   moving the stretching rod counter to the stretching direction as a function of a movement of the blow moulding station; and
   adjusting said guide cam during the conversion of the machine.

11. Method according to claim 10, further comprising adjusting the guide cam as a function of a height of the bottom mould.

12. Apparatus for shaping plastic preforms into plastic containers, comprising:
   a plurality of blow moulding stations, each of which has a cavity in which the plastic preforms can be shaped into plastic containers, said blow moulding stations being arranged on a movable carrier, each moulding station having
      a stretching rod which stretches the plastic containers in their longitudinal direction by a movement in a stretching direction; and
      a drive device for driving the stretching rod in the stretching direction;
   a guide cam which is arranged in a stationary manner and by means of which the stretching rod is movable counter to the stretching direction as a function of a movement of the blow moulding station, at least one portion of said guide cam being adjustable; and
   a display device which outputs information characteristic of a position of the guide cam,
   wherein, by virtue of said adjustment, a dependency of the movement of the stretching rod counter to the stretching direction on the movement of the blow moulding station is variable.

* * * * *